United States Patent
Choi et al.

(10) Patent No.: US 11,492,287 B2
(45) Date of Patent: Nov. 8, 2022

(54) ENAMEL COMPOSITION, MANUFACTURING METHOD THEREFOR, AND COOKING UTENSILS

(71) Applicant: LG Electronics Inc., Seoul (KR)

(72) Inventors: Suyeon Choi, Seoul (KR); Young Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/049,788

(22) PCT Filed: Apr. 17, 2019

(86) PCT No.: PCT/KR2019/004637
§ 371 (c)(1),
(2) Date: Oct. 22, 2020

(87) PCT Pub. No.: WO2019/208969
PCT Pub. Date: Oct. 31, 2019

(65) Prior Publication Data
US 2021/0246067 A1     Aug. 12, 2021

(30) Foreign Application Priority Data
Apr. 24, 2018  (KR) ........................ 10-2018-0047437

(51) Int. Cl.
  *C03C 8/04*   (2006.01)
  *F24C 15/00*  (2006.01)
  (Continued)

(52) U.S. Cl.
  CPC .............. *C03C 8/04* (2013.01); *C03B 27/004* (2013.01); *C03C 3/089* (2013.01); *C03C 3/095* (2013.01);
  (Continued)

(58) Field of Classification Search
  CPC ............ C03C 8/02; C03C 8/04; F24C 15/005
  See application file for complete search history.

(56) References Cited

U.S. PATENT DOCUMENTS 4,361,654 A * 11/1982 Ohmura .................... C03C 8/08
                                                           501/24
4,877,758 A * 10/1989 Lee .......................... C03C 8/08
                                                           501/24
(Continued)

FOREIGN PATENT DOCUMENTS

DE        3936284 A  *  5/1991   ............... C03C 8/02
DE        4200237 A1 *  7/1993   ............... C03C 8/02
(Continued)

OTHER PUBLICATIONS

Extended European Search Report in European Appln. No. 19791676.0, dated Jan. 12, 2022, 7 pages.

*Primary Examiner* — Karl E Group
(74) *Attorney, Agent, or Firm* — Fish & Richardson P.C.

(57) ABSTRACT

The present invention relates to an enamel composition capable of removing sugars as well as poultry oils as contaminants at a low temperature by using a catalyst oxide, to a manufacturing method therefor, and cooking utensils. The present invention provides an enamel composition, a manufacturing method therefor, and cooking utensils, wherein the enamel composition is capable of removing sugars as well as poultry oils as contaminants at a low temperature by comprising: at least one of $SiO_2$, $B_2O_3$, $Li_2O$, $Na_2O$, and $K_2O$; and $TiO_2$.

4 Claims, 1 Drawing Sheet

(51) Int. Cl.
*C03B 27/004* (2006.01)
*C03C 3/089* (2006.01)
*C03C 3/095* (2006.01)
*C03C 8/02* (2006.01)

(52) U.S. Cl.
CPC .............. *C03C 8/02* (2013.01); *F24C 15/005* (2013.01); *C03C 2207/00* (2013.01)

(56) References Cited

U.S. PATENT DOCUMENTS

| | | | |
|---|---|---|---|
| 5,296,415 A | * | 3/1994 | Podesta ..................... C03C 8/06 |
| | | | 148/26 |
| 9,072,400 B2 | | 7/2015 | Benford et al. |
| 2011/0049122 A1 | | 3/2011 | Baek et al. |
| 2011/0262758 A1 | | 10/2011 | Benford et al. |
| 2012/0282407 A1 | | 11/2012 | Singh et al. |
| 2013/0299482 A1 | | 11/2013 | Kim et al. |
| 2013/0299484 A1 | | 11/2013 | Lee et al. |
| 2014/0302331 A1 | | 10/2014 | Benford et al. |
| 2019/0049119 A1 | | 2/2019 | Iwamoto et al. |

FOREIGN PATENT DOCUMENTS

| | | | | |
|---|---|---|---|---|
| EP | 0526769 | | 2/1993 | |
| EP | 2470482 | | 7/2012 | |
| JP | 2011011958 | | 1/2011 | |
| JP | 2014518834 | | 8/2014 | |
| JP | 2017201232 | | 11/2017 | |
| KR | 20130125910 | | 11/2013 | |
| KR | 20130125918 | | 11/2013 | |
| KR | 20130125918 A | * | 11/2013 | |
| SU | 601242 A | * | 3/1978 | ............... C03C 8/12 |

\* cited by examiner

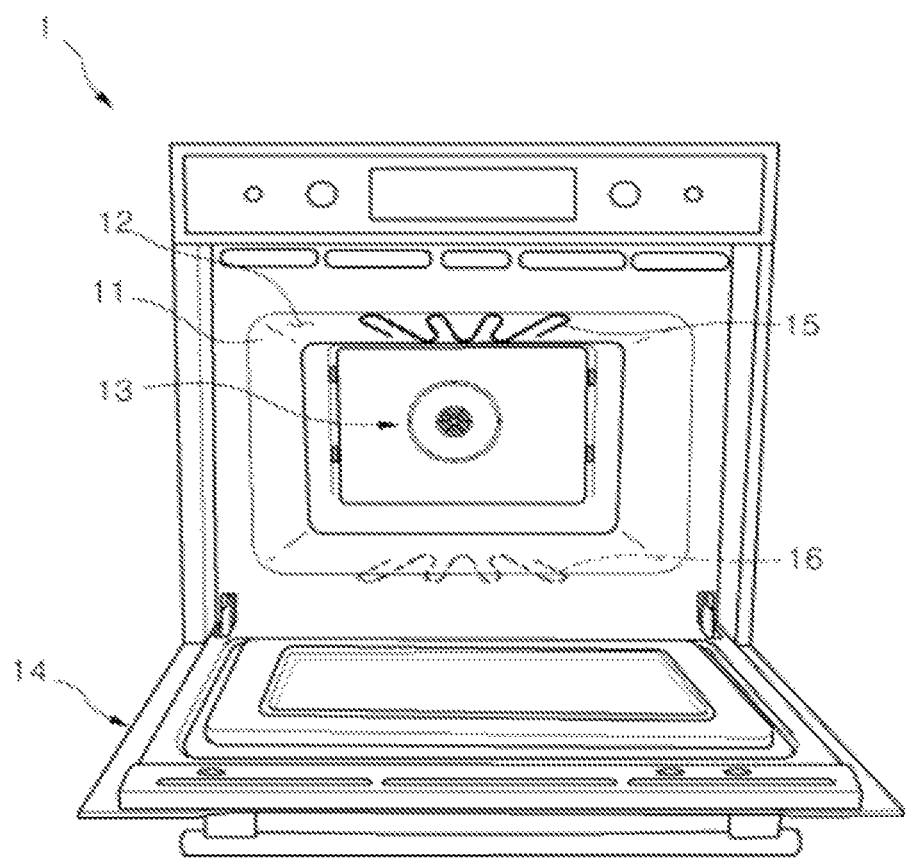

ENAMEL COMPOSITION, MANUFACTURING METHOD THEREFOR, AND COOKING UTENSILS

CROSS-REFERENCE TO RELATED APPLICATIONS

This application is a National Stage application under 35 U.S.C. § 371 of International Application No. PCT/KR2019/004637, filed on Apr. 17, 2019, which claims the benefit of Korean Patent Application No. 10-2018-0047437, filed on Apr. 24, 2018. The disclosures of the prior applications are incorporated by reference in their entirety.

TECHNICAL FIELD

Disclosed herein is an enamel composition, a preparation method therefor, and a cooking appliance using the same from which a contaminant such as sugar as well as poultry fat is cleaned using a catalyst oxide at a low temperature.

BACKGROUND ART

Enamel is a substance where a glass glaze is applied onto a surface of a metallic plate. Ordinary enamel is used for cooking appliances, such as microwave ovens and ovens, for example.

Cooking appliances, such as electric ovens and gas ovens, for example, are devices that cook food or other items (hereinafter, collectively "food") using a heat source. Contaminants, for example, produced during cooking, are attached to an inner wall of a cavity of a cooking appliance. Accordingly, the inner wall of the cavity needs to be cleaned. The inner wall of the cavity can be easily cleaned through a pyrolysis, where contaminants are burned to ashes at high temperatures. Further, the inner wall of the cavity, coated with an enamel composition including phosphorus pentoxide ($P_2O_5$), Group I oxides and Group II oxides, can be easily cleaned without a high-temperature heating process.

Although the enamel composition includes $P_2O_5$, Group I oxides and Group II oxides, the enamel composition needs to be soaked in water for at least 30 minutes at 100° C. or higher such that poultry fat is cleaned from the enamel composition.

Although the enamel composition includes $P_2O_5$, Group I oxides and Group II oxides, the enamel composition needs to be cleaned at high temperatures of 450° C. to 500° C. such that sugar is cleaned from the enamel composition. Specific contaminants can be cleaned only after being soaked in water.

Further, even though the enamel composition includes $P_2O_5$, Group I oxides and Group II oxides, the enamel composition has to be coated in two layers such that poultry fat and sugar are all removed from the enamel composition.

SUMMARY

Technical Problems

The present disclosure is directed to an enamel composition from which poultry fat may be cleaned without being soaked in water.

The present disclosure is also directed to an enamel composition from which sugar as well as poultry fat may be cleaned at a temperature lower than 450° C. to 500° C. by 100° C. or greater.

The present disclosure is also directed to an enamel composition from which poultry fat and sugar may all be removed by a single composition.

Technical Solutions

According to embodiments, provided is an enamel composition from which contaminants such as poultry fat may be cleaned without being soaked in water, the enamel composition comprising: silicon dioxide ($SiO_2$); boron trioxide ($B_2O_3$); at least one of lithium oxide ($Li_2O$), sodium oxide ($Na_2O$) and potassium oxide ($K_2O$); and titanium oxide ($TiO_2$).

According to the embodiments, provided is an enamel composition from which sugar as well as poultry fat may be cleaned at a temperature lower than 450° C. to 500° C. by 100° C. or greater, the enamel composition further comprising: at least one of vanadium oxide ($V_2O_5$) and copper oxide (CuO); and at least one of cobalt oxide ($Co_3O_4$) and cerium oxide ($CeO_2$).

According to the embodiments, provided is an enamel composition from which the poultry fat and sugar may all be removed by a single composition, the enamel composition further comprising zinc oxide (ZnO).

Advantageous Effects

The enamel composition may comprise $SiO_2$; $B_2O_3$; at least one of $Li_2O$, $Na_2O$ and $K_2O$; and $TiO_2$. Accordingly, the enamel composition may be cleaned without wasting excessive time.

Additionally, the enamel composition may further comprise at least one of $V_2O_5$ and CuO; and at least one of $Co_3O_4$ and $CeO_2$. Accordingly, sugar may be cleaned from the enamel composition at a temperature lower than 450° C. to 500° C. by 100° C. or greater. Thus, energy may be saved and an amount of smoke, which is generated when the contaminant is burned, may be reduced.

Further, the enamel composition may comprise ZnO at an optimal ratio. Accordingly, all contaminants may be cleaned from the enamel composition coated only in a single layer without being soaked in water. Thus, process efficiency and durability may be increased.

BRIEF DESCRIPTION OF DRAWINGS

FIGURE is a front view showing an example cooking appliance.

BEST MODE

The above-described aspects, features and advantages are specifically described hereunder, such that one having ordinary skill in the art to which the present disclosure pertains may easily implement the technical spirit of the disclosure. In description of the disclosure, detailed description of known technologies in relation to the disclosure is omitted if it is deemed to make the gist of the disclosure unnecessarily vague. Below, preferred embodiments according to the disclosure are specifically described.

The embodiments set forth herein may be implemented in various different forms, and should not be construed as being limited to the present disclosure. Rather, these embodiments are provided as examples so that the disclosure will be thorough and complete and will fully convey the subject matter to one having ordinary skill in the art to which the disclosure pertains. Below, an enamel composition from which contaminants such as sugar as well as poultry fat are cleaned using a catalyst oxide at a low temperature, a preparation method therefor, and a cooking appliance using the same are described specifically.

Enamel Composition

An enamel composition according to embodiments may comprise silicon dioxide ($SiO_2$); boron trioxide ($B_2O_3$); at least one of lithium oxide ($Li_2O$), sodium oxide ($Na_2O$) and potassium oxide ($K_2O$); and titanium oxide ($TiO_2$).

$SiO_2$ and $B_2O_3$ may serve as glass formers that help addition of a large amount of transition metal oxides into the enamel composition.

$SiO_2$, which is a component for forming a glass structure, may strengthen a skeleton of the glass structure and reveal properties of a transition metal oxide. The component $SiO_2$ may be included in a range of 30 wt % to 55 wt %. When more than 55 wt % of $SiO_2$ is included, a cleaning performance of the enamel composition may be deteriorated. When less than 30 wt % of $SiO_2$ is included, glass composition may be collapsed.

$B_2O_3$ may serve as a glass former and help the enamel composition to maintain a proper viscosity during a melting process, thereby making it possible to prevent crystallization of a glass composition. $B_2O_3$ may also help each component of the enamel composition to uniformly melt. Additionally, $B_2O_3$ may adjust a coefficient of thermal expansion and a fusion flow of the enamel composition to improve a coating performance of the enamel composition. $B_2O_3$ may be included in a range of 1 wt % to 15 wt %. When more than 15 wt % of $B_2O_3$ is included, the component may interfere with an addition of a transition metal oxide, causing deterioration in the cleaning performance. When less than 1 wt % of $B_2O_3$ is included, glass composition may be collapsed, or crystallization of a glass composition may occur.

$Li_2O$, $Na_2O$, and $K_2O$, which are Group I oxides, may control a pyrolysis of a transition metal ion and may improve a cleaning performance of a transition metal oxide. At least one of $Li_2O$, $Na_2O$, and $K_2O$ may be included in a range of 10 wt % to 30 wt %. When more than 30 wt % of at least one of $Li_2O$, $Na_2O$, and $K_2O$ is included, a coefficient of thermal expansion of glass may be extremely increased and may hardly match a coefficient of thermal expansion of a substrate. When less than 10 wt % of at least one of $Li_2O$, $Na_2O$, and $K_2O$ is included, an amount of an added transition metal oxide may be decreased, causing deterioration in the cleaning performance.

A transition metal oxide may facilitate catalysis on an enamel surface and may easily disconnect a contaminant from the enamel surface. To facilitate catalysis of the transition metal oxide, a solubility in relation to $SiO_2$, serving as a glass former, has to be high. The component $TiO_2$ has an excellent solubility in relation to $SiO_2$. As the enamel composition according to the present disclosure comprises $TiO_2$, catalysis on the enamel surface may be facilitated and the cleaning performance may be improved. The component $TiO_2$ may help clean a contaminant such as poultry fat. The component $TiO_2$ may be included in the enamel composition in a range of 5 wt % to 15 wt %. When more than 15 wt % of $TiO_2$ is included, thermal properties may be degraded. When less than 5 wt % of $TiO_2$ is included, a level of catalysis may be reduced, causing deterioration in the cleaning performance.

The enamel composition may further comprise ZnO. $SiO_2$ and $B_2O_3$ may serve as a network-forming oxide that forms a glass structure. $Li_2O$, $Na_2O$, and $K_2O$, which are Group I oxides, may serve as a network-modifying oxide that ensure coloring, transparency, durability and conductivity of glass. The component ZnO may serve as an intermediate oxide that balances the network-forming oxide with the network-modifying oxide. As the enamel composition further comprises ZnO, a surface tension may be controlled and surface characteristics of an enamel coating layer may be improved. Additionally, since the enamel composition further comprises ZnO, a high durability may be ensured based on a single-combination enamel composition.

The component ZnO may be included in a range of 1 wt % to 10 wt %. When more than 10 wt % of ZnO is included, the cleaning performance may be deteriorated, and a fusion flow may be reduced. When less than 1 wt % of ZnO is included, surface characteristics of the enamel coating layer may be degraded, and a coating performance may be deteriorated.

The enamel composition according to the present disclosure may further comprise at least one of vanadium oxide ($V_2O_5$) and copper oxide (CuO); and at least one of cobalt oxide ($Co_3O_4$) and cerium oxide ($CeO_2$). $V_2O_5$ and CuO may help clean a contaminant such as poultry fat. $Co_3O_4$ and $CeO_2$ may help clean a contaminant such as sugar.

At least one of $V_2O_5$ and CuO may be included in a range of 5 wt % to 20 wt %. When more than 20 wt % of at least one of $V_2O_5$ and CuO is included, chemical resistance and durability of an enamel coating may be degraded. When more than 20 wt % of at least one of $V_2O_5$ and CuO is included, a cleaning performance against a contaminant such as sugar may be deteriorated. When less than 5 wt % of at least one of $V_2O_5$ and CuO is included, the cleaning performance against a contaminant such as poultry fat may be deteriorated.

At least one of $Co_3O_4$ and $CeO_2$ may be included in a range of 1 wt % to 15 wt %. When more than 15 wt % of at least one of $Co_3O_4$ and $CeO_2$ is included, chemical resistance and durability of the enamel coating may be degraded. When less than 1 wt % of at least one of $Co_3O_4$ and $CeO_2$ is included, a cleaning performance against a contaminant such as sugar may be deteriorated.

An enamel composition according to the present disclosure may comprise: 30 wt % to 55 wt % of silicon dioxide ($SiO_2$); 1 wt % to 15 wt % of boron trioxide ($B_2O_3$); 10 wt % to 30 wt % of at least one of lithium oxide ($Li_2O$), sodium oxide ($Na_2O$), and potassium oxide ($K_2O$); 5 wt % to 15 wt % of titanium oxide ($TiO_2$); 1 wt % to 10 wt % of zinc oxide (ZnO); 5 wt % to 20 wt % of at least one of vanadium oxide ($V_2O_5$) and copper oxide (CuO); and 1 wt % to 15 wt % of at least one of cobalt oxide ($Co_3O_4$) and cerium oxide ($CeO_2$). For example, the enamel composition may comprise 8 wt % to 15 wt % of $TiO_2$; and 5 wt % to 10 wt % of ZnO. The enamel composition with a single-combination optimal composition ratio described above may help clean contaminants such as poultry fat, sugar and the like, and may have improved durability.

The enamel composition, for example, may have a coefficient of thermal expansion (CTE) of 100 to $120 \times 10^{-7}/°$ C. within a range of 50° C. to 350° C. and a glass softening point of a range of 450° C. to 550° C., after calcination. The coefficient of thermal expansion (CTE) may be within a range of 100 to $120 \times 10^{-7}/°$ C. in a range of 50° C. to 350° C. Accordingly, as adhesion of the enamel composition is increased, a glass structure may become more stable. As the glass softening point is within the range of 450° C. to 550° C., the enamel composition may form a structure that is not deformed even at high temperatures.

Preparation Method for Enamel Composition

A preparation method for an enamel composition according to embodiments may comprise supplying materials for an enamel composition including: silicon dioxide (SiO$_2$); boron trioxide (B$_2$O$_3$); at least one of lithium oxide (Li$_2$O), sodium oxide (Na$_2$O) and potassium oxide (K$_2$O); and titanium oxide (TiO$_2$), melting the materials for an enamel composition, cooling the melted materials for an enamel composition in a quenching roller, and forming an enamel composition.

The materials for an enamel composition may further comprise zinc oxide (ZnO); at least one of vanadium oxide (V$_2$O$_5$) and copper oxide (CuO); and at least one of cobalt oxide (Co$_3$O$_4$) and cerium oxide (CeO$_2$).

The materials for an enamel composition may comprise: 30 wt % to 55 wt % of SiO$_2$; 1 wt % to 15 wt % of B$_2$O$_3$; 10 wt % to 30 wt % of at least one of Li$_2$O, Na$_2$O, and K$_2$O; 5 wt % to 15 wt % of TiO$_2$; 1 wt % to 10 wt % of ZnO; 5 wt % to 20 wt % of at least one of V$_2$O$_5$ and CuO; and 1 wt % to 15 wt % of at least one of Co$_3$O$_4$ and CeO$_2$.

For example, the materials for an enamel composition may comprise 8 wt % to 15 wt % of TiO$_2$; and 5 wt % to 10 wt % of ZnO.

Sodium carbonate (Na$_2$CO$_3$), potassium carbonate (K$_2$CO$_3$), and lithium carbonate (Li$_2$CO$_3$) may be respectively used as a raw material for Na$_2$O, K$_2$O, and Li$_2$O, but not be limited.

After sufficiently mixed, the materials for an enamel composition may be melted. For example, the materials for an enamel composition may be melted in a range of 1200° C. to 1400° C. The materials for an enamel composition may be melted for one to two hours.

Then the melted materials for an enamel composition may be rapidly cooled in a quenching roller using a chiller and the like. As a result, the enamel composition may be prepared.

Cooking Appliance

The enamel composition according to embodiments may be coated on one surface of an object to be coated with the enamel composition. The object may comprise a metal plate, a glass plate, and all or part of a cooking appliance. For example, an inner surface of a cavity or a door of a cooking appliance may be coated with the enamel composition.

Referring to FIGURE, a cooking appliance 1 may comprise a cavity 11 in which a cooking chamber 12 is formed, a door 14 that opens and closes the cooking chamber 12, and at least one heat source 13,15,16 that supplies heat for cooking food in the cooking chamber 12. The cavity 11 may have a cuboid shape, a front surface of which is open. The heat source 13, 15, 16 may comprise a convection assembly 13 that discharges heated air into the cavity 11, an upper heater 15 disposed at an upper portion of the cavity 11, and a lower heater 16 disposed at a lower portion of the cavity 11. The upper heater 15 and the lower heater 16 may be provided inside or outside of the cavity 11. The heat source 13, 15, 16 may not necessarily include all the convection assembly 13, the upper heater 15, and the lower heater 16. That is, the heat source 13, 15, 16 may include at least one of the convection assembly 13, the upper heater 15, and the lower heater 16.

The enamel composition according to embodiments may be coated on an inner surface of the cavity 11 or the door 14 of the cooking appliance 1 in a dry process or a wet process.

During the dry process, the materials for an enamel composition may be dispersed in an organic binder, the mixed materials and organic binder may be milled in a ball mill, and a glass frit may be manufactured. During the wet process, the materials for an enamel composition may be dispersed in water (H$_2$O) and pigment, the mixed materials, water (H$_2$O) and pigment may be milled in a ball mill, and a glass frit may be manufactured.

Then the glass frit prepared in the dry process or the wet process may be applied onto the inner surface of the cavity 11 or the door 14 of the cooking appliance 1 through a spray process, for example. The applied glass frit may be calcinated for 300 to 450 seconds in a range of 600° C. to 900° C., and may be coated on the inner surface of the cavity 11 or the door 14 of the cooking appliance 1.

Hereinafter, embodiments will be described with reference to examples.

Example

Preparation for Enamel Composition

An enamel composition having a composition ratio in table 1 below was prepared. A raw material for each component was sufficiently mixed for three hours in a V-mixer. Sodium carbonate (Na$_2$CO$_3$), potassium carbonate (K$_2$CO$_3$), and lithium carbonate (Li$_2$CO$_3$) were respectively used as a raw material for Na$_2$O, K$_2$O, and Li$_2$O, and the remaining materials are shown in table 1. The mixed materials were sufficiently melted for one and a half hours at 1300° C. and were rapidly cooled in a quenching roller. Then a glass cullet was obtained.

Then 0.1 to 1 wt % of organopolysiloxane was put into the glass cullet obtained in the above-described processes. Initial granularity of the glass cullet was controlled with a grinder (a ball mill), and the glass cullet was ground for about five hours using a jet mill. Then the ground glass cullet was allowed to pass through a 325 mesh sieve (ASTM C285-88) such that a particle diameter of the glass cullet was limited to 45 µm or less. As a result, frits (powder) were prepared. The frits were sprayed onto a low carbon steel sheet with a width of 200 mm, a height of 200 mm, and a thickness of 1 mm or less, using a corona discharge gun. A voltage of the discharge gun was controlled under the conditions of 40 kV to 100 kV, and an amount of the frits sprayed on the low carbon steel sheet was 300 g/m$^2$. The low carbon steel sheet, onto which the frits were sprayed, was calcinated at 780° C. to 850° C. for 300 to 450 seconds to form a coating layer on one surface of the low carbon steel sheet. In this case, the coating layer was formed to have thicknesses of about 80 µm to 250 µm.

TABLE 1

| Component | Embodiment | | | | | | | Comparative example | | |
|---|---|---|---|---|---|---|---|---|---|---|
| (wt %) | 1 | 2 | 3 | 4 | 5 | 6 | 7 | 1 | 2 | 3 |
| SiO$_2$ | 42.97 | 48.15 | 45.96 | 35.96 | 42.96 | 36.98 | 45.63 | 54.74 | 54.74 | 48.96 |
| B$_2$O$_3$ | 3.78 | 4.24 | 4.05 | 14.05 | 3.75 | 12.04 | 4.36 | 4.82 | 4.82 | 3.34 |
| Li$_2$O | 0.98 | 1.09 | 1.04 | 1.04 | 1.26 | 0.98 | 1.23 | 1.24 | 1.24 | 1.23 |
| Na$_2$O | 8.30 | 9.30 | 8.88 | 8.16 | 8.46 | 8.54 | 8.98 | 10.58 | 10.58 | 10.65 |

TABLE 1-continued

| Component | Embodiment | | | | | | | Comparative example | | |
|---|---|---|---|---|---|---|---|---|---|---|
| (wt %) | 1 | 2 | 3 | 4 | 5 | 6 | 7 | 1 | 2 | 3 |
| $K_2O$ | 6.84 | 7.66 | 7.31 | 7.31 | 7.21 | 7.23 | 7.21 | 8.71 | 8.71 | 8.65 |
| $TiO_2$ | 13.00 | 8.75 | 8.75 | 8.75 | 12.32 | 12.32 | 8.76 | 13.37 | 0 | 0 |
| $V_2O_5$ | 13.00 | 8.75 | 8.75 | 8.75 | 6.23 | 6.58 | 8.76 | 0 | 0 | 0 |
| $Co_3O_4$ | 0 | 4.00 | 0 | 6.00 | 7.01 | 1.13 | 7.29 | 0 | 0 | 8.45 |
| CuO | 4.00 | 2.50 | 2.50 | 2.50 | 5.32 | 0 | 2.60 | 0 | 0 | 0 |
| ZnO | 5.13 | 5.56 | 5.48 | 5.48 | 5.48 | 8.64 | 5.18 | 6.54 | 9.54 | 5.48 |
| $CeO_2$ | 2.00 | 0 | 7.28 | 2.00 | 0 | 5.56 | 0 | 0 | 5.00 | 13.24 |
| $MoO_3$ | 0 | 0 | 0 | 0 | 0 | 0 | 0 | 0 | 5.37 | 0 |

Preparation for Enamel Composition Sample

The enamel compositions according to embodiments 1 to 7 and comparative examples 1 to 3 were sprayed onto a total of 10 low carbon steel sheets with a width of 200 mm, a height of 200 mm, and a thickness of 1 mm, using an ordinary corona discharge gun. A voltage of the corona discharge gun was controlled in a range of 40 kV to 100 kV. An amount of the enamel composition sprayed on the low carbon steel sheet was about 300 g/m². The low carbon steel sheets, onto which the enamel compositions were sprayed, were calcinated in a range of 780° C. to 850° C. for 300 to 450 seconds to prepare a total of 10 enamel composition samples.

Experimental Example

Performance of the enamel composition samples prepared according to the embodiments and comparative examples was evaluated as follows. Table 3 shows results of the evaluation.

1. Evaluation of Cleaning Performance

To evaluate a cleaning performance of the enamel composition samples, 1 g of chicken fat as a contaminant was evenly thinly applied using a brush on a surface of the samples, where a metallic substrate (200×200 mm) was coated with the enamel compositions, and then a specimen, to which the contaminant was applied, was put into a thermostat at 280° C. for an hour to fix the contaminant.

After the fixation, the specimen was naturally cooled and a hardness of the contaminant was checked. Then the hardened chicken fat was cleaned with wet cloth, using a force of 3 kgf or less. A portion on the contaminated surface of the samples, cleaned using a rod having a flat bottom and a diameter of 5 cm, was uniformized. Frequency of back and forth cleaning motions was measured and the frequency was defined as frequency of back and forth cleaning motions. Table 2 shows indices of evaluation of the cleaning performance.

Further, to evaluate a cleaning performance of the enamel composition samples, cherry pie feeling was used instead of chicken fat. The cleaning performance was evaluated under the same conditions described above except that cherry pie feeling was fixed at 250° C. for an hour and then burned at 350° C. for an hour.

TABLE 2

| Frequency of back and forth cleaning motion | Level |
|---|---|
| 1~5 | LV.5 |
| 6~15 | LV.4 |
| 16~25 | LV.3 |
| 26~50 | LV.2 |
| 51~ | LV.1 |

2. Evaluation of Acid Resistance and Alkali Resistance

Acid resistance and alkali resistance of the enamel composition samples were evaluated based on ASTM and ISO 2722. The grading scale is described as follows: AA (very good); A (good); B (average); C (poor); D (very poor).

TABLE 3

| | Embodiment | | | | | | | Comparative example | | |
|---|---|---|---|---|---|---|---|---|---|---|
| | 1 | 2 | 3 | 4 | 5 | 6 | 7 | 1 | 2 | 3 |
| Cleaning performance against poultry fat | LV.5 | LV.5 | LV.5 | LV.5 | LV.5 | LV.5 | LV.5 | LV.4 | LV.3 | LV.3 |
| Cleaning performance against sugar | LV.4 | LV.4 | LV.5 | LV.4 | LV.4 | LV.4 | LV.5 | LV.1 | LV.1 | LV.2 |
| Acid resistance | A | A | A | A | A | A | A | A | A | A |
| Alkali resistance | AA | AA | AA | AA | AA | AA | AA | AA | AA | AA |

As shown in Table 3, the embodiments according to the present disclosure may ensure an excellent cleaning performance against a contaminant such as sugar as well as poultry fat. Additionally, the enamel composition samples made of a single-combination enamel composition have excellent acid resistance and alkali resistance.

Unlike the embodiments, the comparative examples ensured a cleaning performance against a contaminant such as poultry fat but showed deterioration in a cleaning performance against a contaminant such as sugar.

The embodiments have been described with reference to a number of illustrative embodiments thereof. However, it should be understood that the present disclosure is not intended to limit the embodiments and drawings set forth herein and that numerous other modifications and embodiments can be devised by those skilled in the art. Additionally, though not explicitly described during description of the embodiments, predictable effects based on the configurations of the embodiments should be acknowledged.

DESCRIPTION OF SYMBOLS

1: Cooking appliance
11: Cavity
12: Cooking chamber
13: Convection assembly
14: Door
15: Upper heater
16: Lower heater

The invention claimed is:

1. An enamel composition, comprising:
   30 wt % to 55 wt % of silicon dioxide ($SiO_2$);
   1 wt % to 15 wt % of boron trioxide ($B_2O_3$);
   10 wt % to 30 wt % of at least one of lithium oxide ($Li_2O$), sodium oxide ($Na_2O$), and potassium oxide ($K_2O$);
   5 wt % to 15 wt % of titanium oxide ($TiO_2$);
   1 wt % to 10 wt % of zinc oxide (ZnO);
   5 wt % to 20 wt % of at least one of vanadium oxide ($V_2O_5$) and copper oxide (CuO); and
   1 wt % to 15 wt % of at least one of cobalt oxide ($Co_3O_4$) and cerium oxide ($CeO_2$).

2. The enamel composition of claim 1, comprising:
   8 wt % to 15 wt % of $TiO_2$; and
   5 wt % to 10 wt % of ZnO.

3. A preparation method for an enamel composition, comprising:
   supplying materials for the enamel composition, the materials comprising:
       30 wt % to 55 wt % of silicon dioxide ($SiO_2$),
       1 wt % to 15 wt % of boron trioxide ($B_2O_3$),
       10 wt % to 30 wt % of at least one of lithium oxide ($Li_2O$), sodium oxide ($Na_2O$), and potassium oxide ($K_2O$),
       5 wt % to 15 wt % of titanium oxide ($TiO_2$),
       1 wt % to 10 wt % of zinc oxide (ZnO),
       5 wt % to 20 wt % of at least one of vanadium oxide ($V_2O_5$) and copper oxide (CuO), and
       1 wt % to 15 wt % of at least one of cobalt oxide ($Co_3O_4$) and cerium oxide ($CeO_2$);
   melting the materials; and
   cooling the melted materials in a quenching roller to form the enamel composition.

4. The preparation method of claim 3, wherein the materials comprise:
   8 wt % to 15 wt % of $TiO_2$; and
   5 wt % to 10 wt % of ZnO.